UNITED STATES PATENT OFFICE.

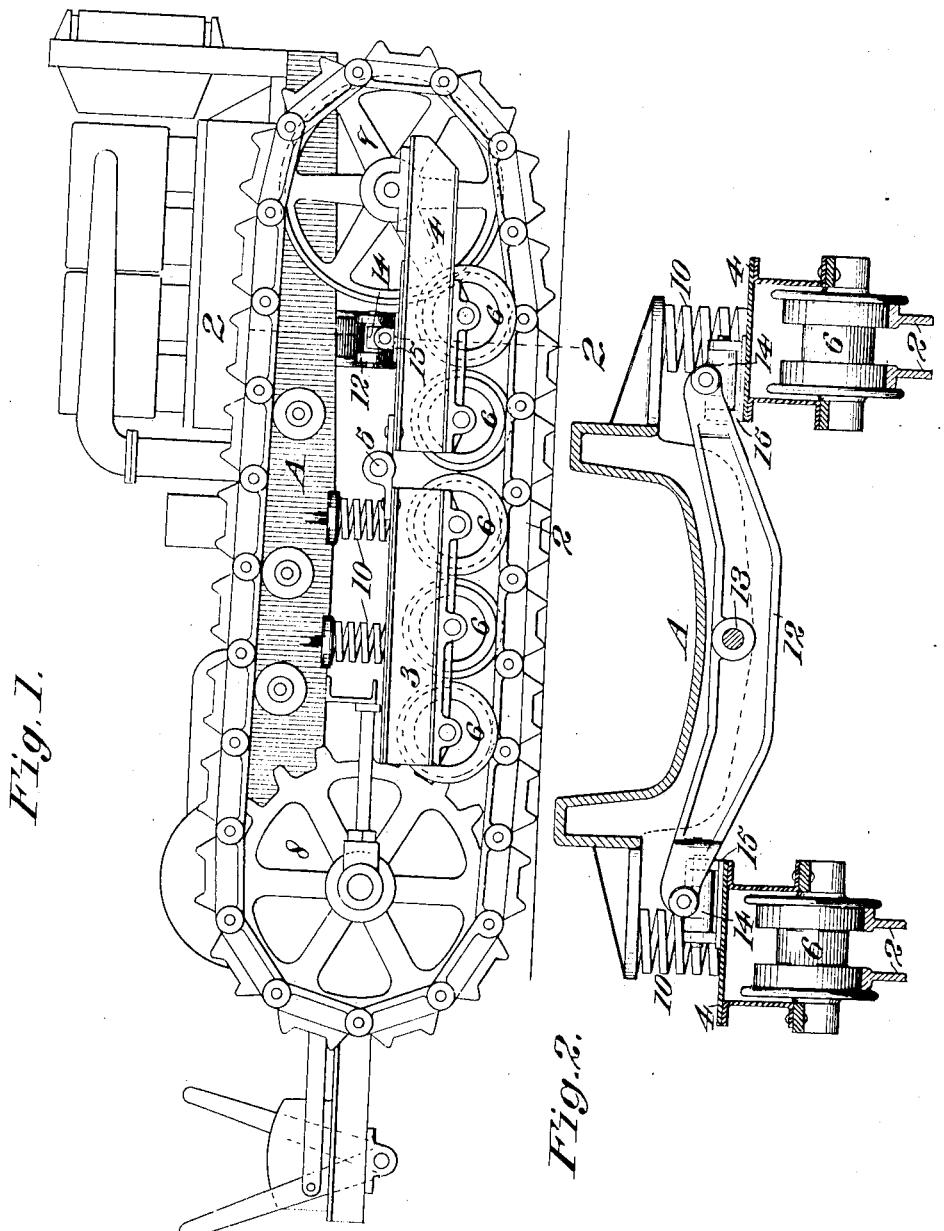

WILLIAM TURNBULL, OF PEORIA, ILLINOIS, ASSIGNOR TO THE HOLT MANUFACTURING COMPANY, OF STOCKTON, CALIFORNIA, A CORPORATION OF CALIFORNIA.

TRACTOR.

1,258,602.     Specification of Letters Patent.     Patented Mar. 5, 1918.

Application filed January 12, 1915, Serial No. 1,766. Renewed December 6, 1916. Serial No. 135,488.

*To all whom it may concern:*

Be it known that I, WILLIAM TURNBULL, a citizen of the United States, residing at Peoria, in the county of Peoria and State of Illinois, have invented new and useful Improvements in Tractors, of which the following is a specification.

This invention relates to vehicles of the self-laying track variety, and pertains especially to a novel method of supporting a traction engine frame on the self-laying tracks.

In a prior application filed on or about February 24, 1914, Serial Number 820,504, by Emil F. Norelius was described a machine in which the main frame was supported on three sets of springs on each side of the machine. Two of these sets were located on the rear truck section and the third set was located on the front truck section; the two truck sections making up the truck on each side of the machine being hinged together at the center forming a flexible truck member.

In the present arrangement I do away with the front set of springs and substitute therefor an equalizing bar which is pivoted at the center of the frame, and the ends of the bar are connected by a universal joint with the front truck sections. The weight of the frame is, therefore, carried by means of springs on the rear truck sections and by means of this equalizing bar on the front truck sections. The result of this arrangement is the practical provision of a three point suspension for the main frame, adding to the flexibility of the truck structure and avoiding all twisting strains on the engine frame itself.

The invention consists of the parts and the construction and combination of parts as hereinafter more fully described and claimed, having reference to the accompanying drawings, in which—

Figure 1 is a side elevation.

Fig. 2 is a detail cross section on line 2—2 of Fig. 1.

A represents the frame or chassis of the vehicle, supported by means hereinafter to be described on a pair of endless, flexible, self-laying track belts or members 2. Within each track member is a truck consisting preferably of front and rear sections 4—3, pivoted together at their adjacent ends, as at 5, and having wheels or rollers 6 adapted to run on the track formed on the inner side of the track member. In the present instance, the forward end of a forward section 4 supports an idle sprocket 7 around which the traction member passes back to the drive sprocket 8 suitably journaled on the frame A.

The rear end of the frame A is directly supported on the rear truck sections 3 by yielding load supporting connections, which may consist of springs 10, there preferably being two sets of springs for each rear truck section, as shown. The front end of the frame is supported on the forward truck sections 4 through the medium of an equalizing bar 12 which is pivoted centrally to and beneath frame A at 13; the ends of bar 12 being pivoted to pivot blocks 14, which in turn are pivoted gimbal-ring fashion to brackets 15 on the truck frames, so that a universal joint connection is formed between each truck section 4 and the respective end of the equalizing bar 12.

This form of mounting constitutes as near as possible a three point suspension for the main frame and adds materially to the flexibility of the traction members. The trucks being yieldingly connected at their corresponding ends, in the present instance forward ends, to the main frame at a point located substantially centrally between its sides, the strains on the front truck section are taken up at the center of the frame and not at one side thereof. This construction greatly increases the stability of the vehicle without detracting from the flexibility of the trucks.

Having thus described my invention, what I claim and desire to secure by Letters Patent is—

1. In a vehicle, the combination of a main frame, an endless, flexible track belt on each side of the main frame, rear sprockets and front idlers supporting respectively the rear and front ends of the track belts, a truck within each track belt and having rollers bearing on the ground run thereof, a load supporting connection between the forward ends of the trucks and the main frame at a point located substantially centrally between the sides of the latter, and a load supporting connection between the other end of each truck and the main frame.

2. In a vehicle, the combination of a main frame, an endless, flexible track belt on each side of the main frame, rear sprockets, and front idlers supporting respectively the rear and front ends of the track belts, a truck within each track belt and having rollers bearing on the ground run thereof, a load supporting connection between the forward ends of the trucks, said load supporting connection being pivotally connected to the main frame at a point located substantially centrally between its sides, and a yielding load supporting connection between the other end of each truck and the main frame.

3. In a vehicle, the combination of a main frame, an endless flexible track belt on each side of the main frame, rear sprockets and front idlers supporting respectively the rear and front ends of the track belts, a truck within each track belt and having rollers bearing on the ground run thereof, a yielding load supporting connection between the forward ends of the trucks, said load supporting connection being pivotally connected to the main frame at a point located substantially centrally between its sides, and a yielding load supporting connection between the rear end of each truck and the main frame.

4. In a vehicle, the combination of a main frame, an endless flexible track belt on each side of the main frame, a truck within each track belt and having rollers bearing on the ground run thereof, rear driving sprockets journaled on opposite sides of the main frame and supporting the rear ends of the track belts, front idlers journaled respectively on the trucks and supporting the front ends of the track belts, a yielding load supporting connection between the forward ends of the trucks, said load supporting connection being pivotally connected to the main frame at a point located substantially centrally between its sides, and a yielding load supporting connection between the rear end of each truck and the main frame.

5. In a vehicle, the combination of a frame, a self-laying, flexible, endless track member at each side of the frame, articulated truck sections within each track member, springs between the frame and the rear truck sections, and a cross-bar centrally pivoted to the frame and pivoted at its ends to the front truck sections, whereby the frame is given a three point bearing on the track members.

6. The combination with a vehicle frame, of a pair of endless, flexible traction members arranged on opposite sides thereof, and trucks within the traction members, each truck composed of two articulated alined sections, the rear end of the frame supported on the rear truck sections and the forward end of the frame supported from a point between the trucks upon the forward truck sections.

7. The combination with a vehicle frame, of a pair of endless, flexible traction members upon which the frame is supported, a truck frame within each member, each truck frame comprised of two sections, springs between one set of sections and the frame to yieldingly support the latter at either side, and a single point of support for the opposite end of the frame bearing equally on the other set of sections.

8. The combination with a vehicle frame, of a pair of endless, flexible traction members arranged on opposite sides thereof, trucks within the traction members, each truck composed of a pair of articulated sections, one portion of the frame supported on the rear truck sections, and an equalizing bar fulcrumed on the truck and supporting another part of the frame and the ends of said equalizing bar connected by universal joints with the vehicle truck sections.

9. In a vehicle, the combination of a main frame, an endless flexible track belt on each side of the main frame, rear sprockets and front idlers supporting respectively the rear and front ends of the track belts, a truck within each track belt and having rollers bearing on the ground run thereof, said trucks at their corresponding ends being connected to the main frame at a point located substantially centrally between its sides, and a load supporting connection between the other end of each truck and the main frame, thereby providing a three point suspension of the main frame on the flexible track belts.

10. In a vehicle, the combination of a main frame, an endless flexible track belt on each side of the main frame, a rolling support for the main frame on the track belt, means for supporting one end of the main frame at each side on the said rolling supports, and an equalizing member connected for oscillation with the opposite end of the main frame and supported at its ends on said rolling supports to provide a yielding connection between that end of the frame and its rolling supports whereby the weight of that end of the main frame is equally distributed on each of said rolling supports.

11. In a vehicle, the combination of a main frame, an endless, flexible track belt on each side of the main frame, a truck within each track belt and having rollers bearing on the ground run thereof, a front idler and a rear sprocket around which each track belt travels, an equalizer pivotally supporting a portion of the frame on one end of the trucks, a yielding load supporting connection between the other end of each truck and the main frame.

12. In a vehicle, the combination of a main frame, an endless flexible track belt on each side of the main frame, rear sprockets and front idlers supporting respectively the rear and front ends of the track belts, a truck within each track belt and having rollers bearing on the ground run thereof, means whereby the weight of one end of the main frame is equally distributed upon each of said trucks at their corresponding ends, and a load supporting connection between the other end of each truck and the main frame.

In testimony whereof I have hereunto set my hand in the presence of two subscribing witnesses.

WILLIAM TURNBULL.

Witnesses:
   EMIL F. NORELIUS,
   F. T. MEEKER.